United States Patent
Kobbelt et al.

(10) Patent No.: US 6,901,310 B2
(45) Date of Patent: May 31, 2005

(54) METHOD AND SYSTEM FOR APPROXIMATELY REPRODUCING THE SURFACE OF A WORKPIECE

(75) Inventors: Leif Kobbelt, Aachen (DE); Ulrich Schwanecke, Ulm (DE); Christof Sinn, Mühlacker (DE)

(73) Assignee: Siemens Aktiengesellschaft, München (DE)

( * ) Notice: Subject to any disclaimer, the term of this patent is extended or adjusted under 35 U.S.C. 154(b) by 42 days.

(21) Appl. No.: 10/415,973

(22) PCT Filed: Nov. 5, 2001

(86) PCT No.: PCT/DE01/04150

§ 371 (c)(1),
(2), (4) Date: Jun. 25, 2003

(87) PCT Pub. No.: WO02/37198

PCT Pub. Date: May 10, 2002

(65) Prior Publication Data

US 2004/0054433 A1 Mar. 18, 2004

(30) Foreign Application Priority Data

Nov. 6, 2000 (DE) .......................................... 100 54 902
Nov. 13, 2000 (DE) .......................................... 100 56 143
Jul. 24, 2001 (DE) .......................................... 101 35 992

(51) Int. Cl.$^7$ .............................................. G06F 19/00
(52) U.S. Cl. ........................ 700/187; 700/184; 345/474
(58) Field of Search ................................. 700/180, 182, 700/184, 187; 345/473–474, 635

(56) References Cited

U.S. PATENT DOCUMENTS

| | | | | |
|---|---|---|---|---|
| 5,101,363 A | * | 3/1992 | Rutkowski | 703/7 |
| 5,189,626 A | * | 2/1993 | Colburn | 700/182 |
| 5,543,103 A | * | 8/1996 | Hogan et al. | 264/219 |
| 5,561,601 A | * | 10/1996 | Inoue et al. | 700/182 |
| 5,886,702 A | | 3/1999 | Migdal et al. | |
| 6,016,153 A | | 1/2000 | Gueziec et al. | |
| 6,097,168 A | * | 8/2000 | Katoh et al. | 318/568.11 |
| 2004/0186612 A1 | * | 9/2004 | Edward et al. | 700/160 |

FOREIGN PATENT DOCUMENTS

| | | |
|---|---|---|
| EP | 0 153 556 A | 9/1985 |
| EP | 0 372 107 A | 6/1990 |
| GB | 2 346 222 A | 8/2000 |
| WO | WO 00/45237 A | 8/2000 |

OTHER PUBLICATIONS

Kobbelt L et al.: "A General Framework for Mesh Decimation", Proceedings Graphics Interface 98, Vancouver, BC, Jun. 18–20, 1998, Graphics Interface, Toronto: CIPS, CA, vol. Conf., 24, pp. 43–50 XP001064700 ISBN: 0–9695338–7–X p. 47–50, figures 4–9.

(Continued)

*Primary Examiner*—Leo Picard
*Assistant Examiner*—Zoila Cabrera
(74) *Attorney, Agent, or Firm*—Henry M. Feiereisen

(57) ABSTRACT

A method and system for approximately reproducing the surface of a workpiece should enable the contour of the workpiece to be reconstructed in a particularly simple manner. The invention provides that a starting body, which represents, in whole or in part, the workpiece in a first approximation step, is subdivided into a number of partial volumes, whereby for a reproduction of the workpiece in a second approximation step, the partial volumes are selected for which a step involving an analytical reproduction of the milling volume, which stretches from the milling cutter along a covered milling path, is established.

7 Claims, 8 Drawing Sheets

OTHER PUBLICATIONS

Campagna S et al.: "Dreiecksbeziehungen, Effiziente 3D–Darstellung durch Hierarchische Polygonmodelle", CT Magazin für Computer Technik, Verlag Heinz Heise GmbH., Hannover, Aug. 3, 1998, DE, No. 16, pp. 174–179 XP000767808, ISSN: 0724–8679, p. 175–179.

Kobbelt L et al.: "Multiresolution Hierarchies on Unstructured Triangle Meshes", Computational Geometry. Theory and Applications, Elsevier Science, Amsterdam, NL, Nov. 30, 1999, vol. 14, No. 1–3 pp. 5–24 XP001033663, abstract.

Keichmann K et al.: "Grafisches NC–Testsystem zur umfassenden Simulation", Werkstatt und Betrieb, Carl Hanser Verlag. Munich, DE vol. 129, no ½, pp. 26–29 XP000584023 ISSN: 0043–2792 p. 27–28, Feb. 1996.

Schwarz K: "Simulation—Ein Werkzeug des CNC–Programmierers Simulation– A CNC Programmer's Tool", Werkstatt und Betrieb, Carl Hanser Verlag. Munich, DE vol. 127, No. 7/8, pp. 595–596,598 XP000460940 ISSN: 0043–2792, figures 1,2, 1994.

Westermann R et al.:"Real–Time Exploration of Regular Volume Data by Adaptive Reconstruction of Isosurfaces", Visual Computer, Springer, Berlin. De, vol. 15, No. 2. pp. 100–111 XP001058935 ISSN: 0178–2789, abstract, 1999.

Kobbelt L: "Tight bounding volumes for subdivision surfaces", Computer Graphics and Appplications, 1998. Pacific Graphics '98. Sixth Pacific Conference on Singapore Oct. 26–29, 1998, Los Alamitos, CA, USA, IEEE Comput. Soc, US, pp. 17–26 XP010315482 ISBN: 0–8186–8620–0, figures 7,8.

J. H. Davenport "Computer Algebra" ,1988, pp. 114–122.

Gabriel Taubin "Estimating the Tensor of Curvature of a Surface from a Polyhedral Approximation", 1995, pp. 902–907.

Jules Bloomenthal "Polygonization of Implicit Surfaces" , 1987 pp. 341–355.

William A. Lorensen "Marching Cubes: A High Resolution 3D Surface Construction Algorithm" ,1987 pp. 163–169.

* cited by examiner

METHOD AND SYSTEM FOR APPROXIMATELY REPRODUCING THE SURFACE OF A WORKPIECE

BACKGROUND OF THE INVENTION

The invention relates to a method and a system for approximately reproducing the surface of a workpiece machined with a milling cutter. The invention also relates to a computer program product for carrying out the method and to a computer programmed with the computer program product.

Such method can be applied, for example, to reconstruct or simulate a surface, e.g., a surface of a workpiece to be machined with a milling cutter. The workpiece to be machined its usually modeled with a so-called CAD-system (CAD=computer-aided design). An approximation of the actually produced surface of the workpiece is typically obtained by interpolating target points of a milling cutter in a milling process. One method performed to date for such approximation is the so-called polyhedrization of the geometry of the milling cutter and a computation of polyhedral intersections. The polyhedrization of the milling cutter can cause numerical problem when calculating the intersections and is also particularly complex and time-consuming.

SUMMARY OF THE INVENTION

It is therefore an object of the invention to provide a method of the aforedescribed type, which enables a reconstruction of the workpiece contour in a particularly simple manner. In addition, a suitable system for carrying out the method and a computer program and a computer programmed with the computer program are disclosed.

Referring to the method, the object is solved by the invention in that in a first approximation step a starting body, which entirely or partially represents the workpiece, is subdivided into a number of partial volumes, and in that in a second approximation step those partial volumes are selected for reproducing the workpiece, for which an intersection with an analytic reproduction of the milling volume traversed by the milling cutter along a traversed milling path is detected. Advantageous embodiments of the invention are recited in the dependent claims.

The invention is based on the concept that a significant portion of the numerical complexity of conventional computations of intersections is caused by the handling of the milling cutter and the milling volume traversed along the milling path as a result of its polyhedrization. Accordingly, polyhedrization of the milling volume should be avoided in numerical processing. This can be achieved by evaluating the milling volume analytically. The milling volume can be evaluated analytically by analytically reproducing the milling geometry applied to the milling cutter and by taking into consideration the milling path covered by the milling cutter. Each of these two components can be evaluated analytically, so that the actual outer surface of the milling volume traversed by the milling cutter along the milling path can be analytically derived.

By combining analytical methods with discretization methods, the analytic reproduction of the milling volume or of its so-determined outer surface can be used to suitably select the partial volumes which together form the starting body. For this purpose, a kind of intersection is formed and it is determined, which of the partial volumes are penetrated by the outer surface of the milling volume. The totality of the partial volumes identified in this manner then forms an envelope for this surface, which represents a kind of approximated reproduction of the surface of the workpiece.

It can be determined if a partial volume intersects with a milling volume by determining for one or several points of the respective partial 3-dimensional volume if these points are located within the analytically reproducible milling volume, while at the same time it is determined for one or several other points of the respective 3-dimensional partial volumes if these points are located outside the milling volume. In this case, the outer surface of the milling volume necessarily penetrates the partial volume, so that an intersection exists.

The starting body to be machined, i.e., the workpiece, may exist, for example, in the form of a cuboid (cube) and is advantageously subdivided with a predetermined resolution into a number of elements (also referred to as a elemental sections, volume pixels or voxels). The resolution can be freely selected by the user, with resolutions of 1 □m being technically feasible.

The workpiece contour to be computed is therefore determined based on analytical intersections (or linear approximation of the steps) of the actual milling cutter geometry with the respective elements or voxels. Imperfections of the surface structure can be reliably and easily detected by analytical considering the geometry of the milling cutter, in particular its milling head, for reconstructing the surface. A combination of such analytical description of the milling cutter with a discrete quantitative description of the workpiece or blank provides a high accuracy while keeping the dataset to be processed comparatively small.

Advantageously, the partial volumes are suitably categorized, which can also be used for additional purposes, by evaluating the partial volumes with respect to the milling volume. For this purpose, each partial volume is advantageously associated, based on analytical reproduction of the milling volume, with one of the categories "located within the milling volume", "located in the edge regions of the milling volume" or "located outside the milling volume." In other words: the corresponding partial volume is determined as an outer, inner or edge element or region in relation to the milling volume. Depending on the parameters, a workpiece contour representing the surface is determined or generated on this basis based on the partial volumes associated with edge regions. In other words: voxels or elements referred to as edge regions always contain and envelop the actually existing workpiece contour.

The method is particularly suited when applied in recursive or iterative form. The result obtained by evaluating the intersections in a second approximation step for reproducing the workpiece is used with the method for a new approximation pass. In case of a recursive embodiment, the workpiece can be more finely discretizised by suitable selection of smaller partial volumes in the regions identified as edge zones. In the case of an iterative embodiment, on the other hand, the obtained intermediate result can be used as a starting value when considering a new or second milling path.

In both situations, i.e., with the recursive or iterative approach, the obtained partial volumes, which have been identified to be particularly relevant for characterizing the workpiece surface, are advantageously incorporated when selecting the starting body for the respective next pass of the method. Advantageously, when subsequently determining another approximation step for reproducing the workpiece, only those partial volumes are considered as being part of the starting body, which can be grouped into the categories "located in the edge regions of the milling volume" or "located outside the milling volume." Preferably, for each element or partial volume, the intersections are determined using up to 12 predefined edge points of intersection. In a particularly preferred embodiment, a data type for polyhedrization is a dynamic polyhedron, in particular an octahedron.

Preferably, based on the elements determined as edge region, i.e., partial volumes categorized as "located in the edge regions of the milling volume", a triangular grid representing the workpiece contour is determined by approximating points of intersection. I.e., in a grid-forming step following polyhedrization, the points of intersection computed with respect to the edge voxels (approximated points of intersection) are combined to an interpolating triangular grid.

The simulation of milling processes includes, in addition to allowing for the geometry of the milling cutter, also a visualization of the workpiece contour to be milled. The visualization is advantageously performed over a surface area so that contour imperfections can be better identified. Advantageously, the surface of the workpiece is determined using a dynamic octree. The dynamic octree is hereby determined based on the intersections representing the milling process and continuously updated according to the resulting contour of the workpiece. This guarantees that the shape of the workpiece during the milling process is continuously approximated to the shape of the workpiece to be milled. For example, in a multiple-axes-milling process, in particular in five-axes-milling processes, a cylindrical milling cutter or shafted milling cutter is used.

Regarding the system, i.e., the computer program product as well as the computer programmed with the computer program product, the object is solved by suitable means for carrying out the method, in particular a component or module suitably configured for carrying out the evaluation steps.

The advantages obtained with the invention includes in particular, that by combining an analytical characterization of the milling volume with a discretized evaluation of the workpiece body, a surface can be recursively reconstructed with high accuracy and relatively small numerical complexity. This results in a particularly good contour accuracy and therefore an almost realistic reconstruction of the surfaces of the body, while taking into account the movement and the geometry of the milling cutter. Accordingly, both of the topology of the body and the geometry of a tool, i.e. the milling head, is adequately taken into account, so that, for example, undercut contours of a milled workpiece can be reconstructed or the workpiece contour can be coarsely approximated in a very short time.

BRIEF DESCRIPTION OF THE DRAWING

Embodiments of the invention will be described in more detail with reference to a drawing. The drawing shows in.

DETAILED DESCRIPTION OF PREFERRED EMBODIMENTS

Figure 1:
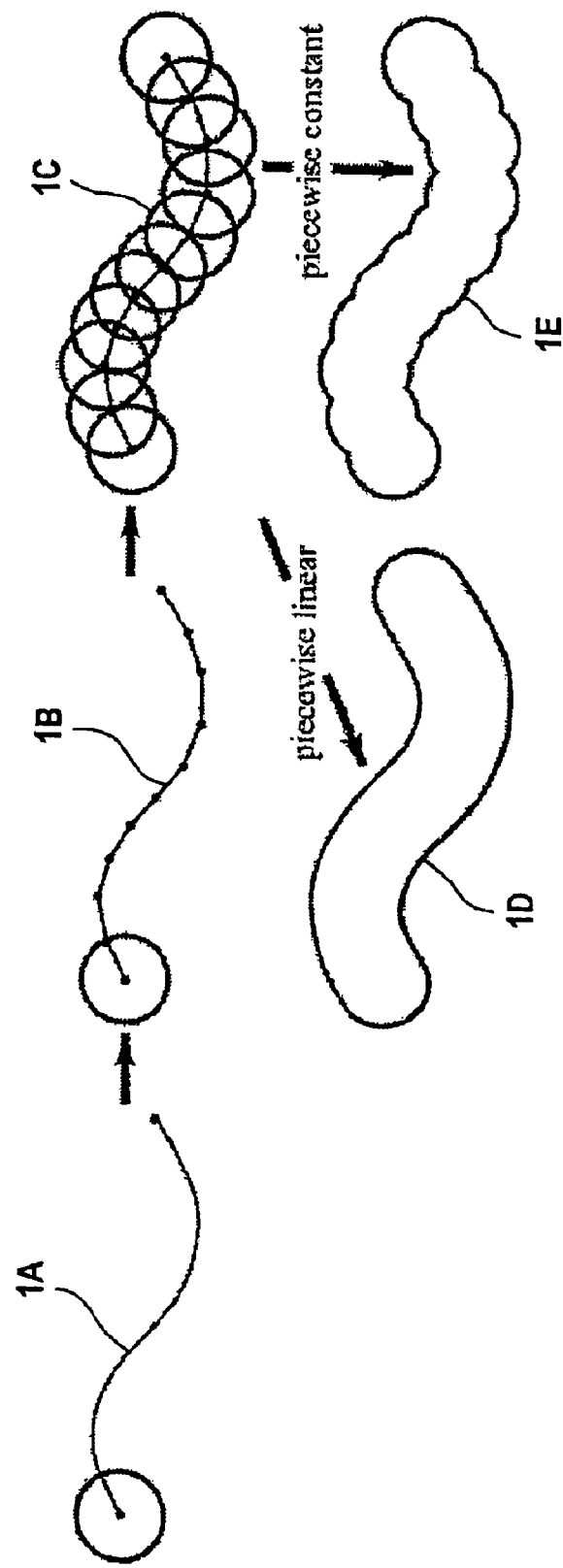
FIG. 1 an envelope determined with constant or linear approximation.

In all Figures, the same reference numerals are applied to identical elements.

The invention is described with reference to an exemplary algorithm for determining or approximately reproducing the surface of a workpiece to be machined with a milling machine. With the preferred algorithm, the geometry of the workpiece is more closely described and determined by a number of surface elements or partial volumes with a defined number of edges. Each element hereby forms a polyhedron, in particular an octahedron.

The totality of partial volumes forms a starting body which reproduces the milled workpiece in a first approximation step. The approximation can be further refined by checking each partial volume to determine if the milling volume traversed by the milling cutter of its milling path intersects with the corresponding partial volume. If this is the case, then the particular partial volume is identified and selected as being particularly relevant for characterizing the workpiece contour. Conversely, if no intersection exists, then it is concluded that the respective partial volume is either entirely inside or entirely outside the milling volume and therefore essentially irrelevant for characterizing the contours produced by the milling process.

The partial volumes selected in this way as being relevant for a coarse characterization of the workpiece contour are, if necessary, used as starting bodies for a repeat pass of this analysis. As a result, in those regions where the actual surface of the workpiece is located and possibly particularly strongly contoured, the partial volumes are successively refined, eventually until reaching a predefined resolving limit. Conversely, the resolution can be comparatively coarse in those spatial regions that are not contacted by the actual workpiece contour. In this way, the grid can be refined as necessary and discretizised, so that a comparatively high accuracy can be achieved with only limited computational resources.

The evaluation takes into account that a body, e.g. a milling head, which moves during the milling operation, generally produces a volume. The volume resulting from the motion of the milling head is also referred to as moved volume. With the help of the so-called polyhedrization, i.e. approximation by polygons, a topologically accurate surface can be reconstructed automatically, with an error tolerance corresponding to a predefined resolution of the changing surface of the workpiece and/or the analytically evaluated motion of the milling head. The polyhedrization of the workpiece contour and approximating the milling cuts by taking into account the geometry of the milling cutter, reliably eliminates the timing problems ("self intersections") observed in conventional processes. The method is particularly suited for use with an NC-program.

In the method for determining the surface of the changing body, the surface is first subdivided into a number of elements with a predetermined number of edges, also referred to as elemental parts or voxels. Analytical cuts along the edges are determined for the voxels based on the corresponding milling cutter geometry. Polyhedrization of the body or workpiece is preferably performed using a polyhedron, e.g. an octahedron. This results in a particularly simple and fast method for determining the surface.

During the milling operation, the surface is continuously determined by linear approximation, in particular approximation of the points of intersection, based on the dynamic polyhedron, in particular the dynamic octahedron. The moving body S, e.g. the workpiece or the milling head, is defined by a given function f based on the analytical 3-dimensional geometry as a partial set of the real numbers in a coordinate system in space $R^3$. The function f is hereby a real continuous implicit function of points of intersections p, also referred to as edge or node points of intersections, with:

$$f(p) = \begin{cases} > 0 & \text{for points of intersection } p \in \Re^3 \text{ in an interior region} \\ = 0 & \text{for points of intersection } p \in \Re^3 \text{ in an edge region} \\ < 0 & \text{for points of intersection } p \in \Re^3 \text{ in an exterior region} \end{cases} \quad [1]$$

The function f is defined for the corresponding body depending on the type and shape of the workpiece, such as a cuboid, and/or the milling head, such as a sphere or a cylinder. For example, the corresponding workpiece or milling cutter is determined based on a predetermined number of simple 3-dimensional geometries or surface geometries or other preset functions describing 3-dimensional analytical geometries. The intersections between the two bodies, workpiece and milling head, are determined using real functions R for a 3-dimensional coordinate system, e.g. for a first body S1 with $f1 \geq 0$ and a second body S2 with $f2 \geq 0$ according to:

Point of intersection: $S3=S1 \cap S2 : f3 = f1 \wedge f2 - \sqrt{f_{1^2} + f_{2^2}}$ combined set: $S3 = S1 \cup S2 : f3 = f1 \vee f2 = f1 + f2 + \sqrt{f_{1^2} + f_{2^2}}$ [2]

complementary set: $S3 = S1 : f3 = -f1$ subtraction: $S3 = S1 \backslash S2 : f3 = f1 \backslash f2 = f1 - f2 - \sqrt{f_{1^2} + f_{2^2}}$.

These real functions have so-called discontinuities c at those points where both arguments are zero, e.g. at a point of intersection along the surfaces of the body.

By using predefined functions for a body, an additional parameter—the time t—is defined and applied during milling in the present method for dynamic reconstruction of the surface of the workpiece. This produces the general function f for a moving body according to:

$$f(x, y, z, t) \geq 0 \quad [3]$$

The complex solution of equation [3] with respect to t produces a discrete approximation for the moving body, such as:

$$S := S(t_1) \cup S(t_1 + dt) \cup S(t_1 + 2dt) \cup \ldots \cup S(t_2) \quad [4]$$

With dt→0 and ∪ defined as a set according to Bloomenthal, J., "Polygonization of implicit surfaces", Computer Aided Geom. Design 5 (1988), 341–345. This approximation with dt going to 0 quite accurately determines the three-dimensional surface, including dynamic changes due to the motion.

A partially continuously linear approximation instead of a partially constant linear approximation can be obtained according to Davenport, J. H., et al. "Computer algebra: systems and algorithms for algebraic computation", Academic Press, 1993, by representing the step that represents the motion of the milling head as a connection between two bodies, wherein the first body represents the origin or starting position and the second body represents the end position, and an envelope surrounding these two positions.

In other words: the connection between two bodies representing the intersection with the corresponding positions and an envelope representing the resulting motion or the intersection are determined as follows:

$$f(x, y, z) = f(x, y, z, t_1) \vee f(x, y, z, t_2) \vee E(x, y, z) \quad [5]$$

with E=envelope, e.g. envelope of the dynamically changing body during the motion of a generator operating on this body, for example a milling head. FIG. 1 depicts the exemplary motion of a spherical or circular milling cutter. The sections of FIG. 1 indicated with the reference numerals 1D and 1E show an envelope E resulting from the different approximation, with the approximation indicated with the reference numeral 1D being the preferred approximation of the present method. The enveloping surface E is hereby the surface which includes essentially all elements of the surface of the corresponding motion, in particular of the milling cut. For example, two elements are shown at times t and t+dt, wherein the first element is defined as an implicit function f with $f(x,y,z,t)=0$ and the second element is defined as an implicit function f with $f(x,y,z,t+dt)=0$. When evaluating the motion or the intersection, both elements are used as a function for determining the envelope. For this purpose, the function of the second element is expanded by the parameter dt, with dt going to 0, according to:

$$f(x, y, z, t) = 0 \text{ and } \frac{\partial f(x, y, z, t)}{\partial t} = 0 \quad [6]$$

Moreover, the implicit form of the envelope (=enveloping surface) is formed preferably by eliminating t from the equations [6]. If the surface or envelope is formed of polynomials, then this elimination is done automatically based on "Computer Algebra" as so-called resultant or as so-called "Gröbner Basis". Alternatively, other forms aside from the aforedescribed irrational functions can also be used. For example, the functions can be replaced with trigonometric functions, such as sine or cosine functions, which can be replaced by representative rational functions according to $2t/(1+t^2)$ or $(1-t^2)*(1+t^2)$ by substituting $\tan(s/2)=t$. To improve the determination of the surface of the body, in particular of the workpiece, over the present state of the technology depicted in FIG. 1, the surface or contour can be explicitly expressed as polygons, in particular convex polygons, or a polygon can be decomposed into triangles. This method for explicit representation based on polygons or triangles is also referred to as polyhedrization.

Figure 2:
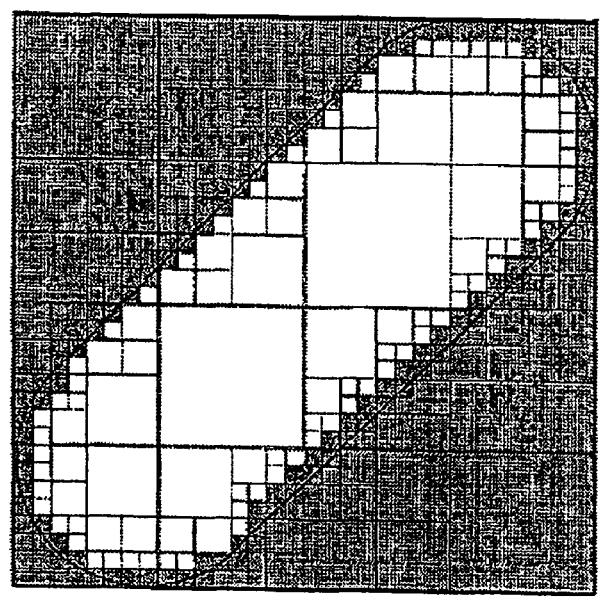
FIGS. 2, 3 an envelope formed with a quadtree or octree.
Figure 3:
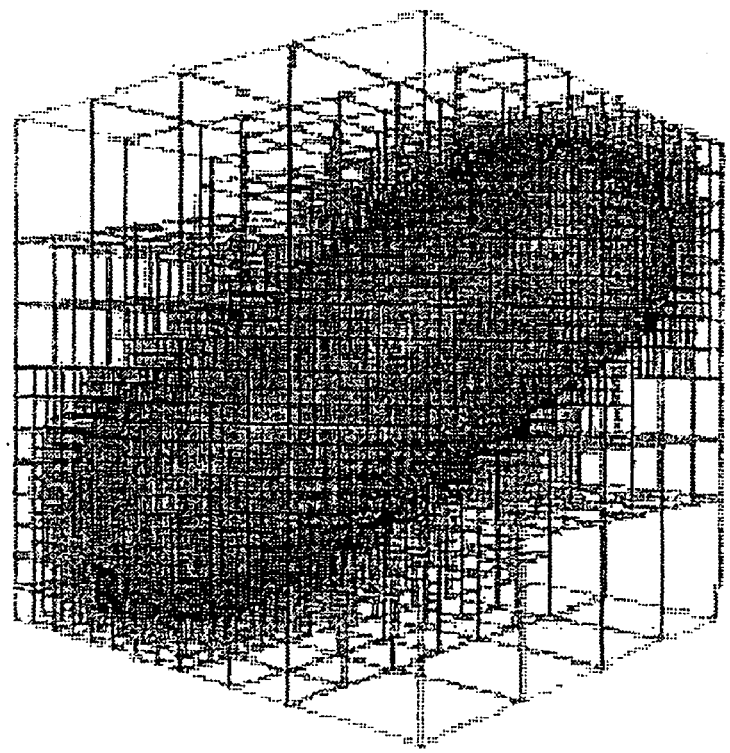

With polyhedrization, the surface of the body, in particular the workpiece contour, is determined based on points of intersection of a three-dimensional coordinate system to thereby determine the position of and connections between resulting surface points or nodes. Such three-dimensional approximation method through binary subdivision based on polyhedral structures is particularly simple and sufficiently accurate. Exemplary polyhedrons, in particular a cuboid structure (see FIG. 2) and an octahedral structure (see FIG. 3) are shown in FIGS. 2 and 3 as implicit functions. The cuboid structure (also referred to as "quadtree") depicted in FIG. 2 or cuboid grid-formation of the three-dimensional surface is obtained by dividing a surface in two dimensions to form polyhedra. In the octahedral structure depicted in FIG. 3 (also referred to as "octree") or octahedral grid-formation, the three-dimensional surface is obtained by subdividing a three-dimensional space to form octahedra. A polygon representation is used which depends on the predefined grid resolution and hence the accuracy with which the surface of the body, in particular the workpiece, is to be rendered. A higher contour resolution can be obtained by increasing the number of regular polyhedra. In particular, an approximation method uses an envelope to reconstruct the surface.

When a so-called octree structure is selected to represent the envelope by an implicit function, the corresponding cell or the respective element of the octree is identified as an outer, inner or edge region (also indicated as a white, gray or black element) based on intersecting edges of the three-dimensional coordinate system. The intersecting edge points are determined from the defined intersections, which are each described by an edge, and from the resulting points of intersection of corresponding edges. Each edge point or intersecting edge point p of an element or a surface represents a node of the octree. Advantageously, the associated implicit function f(p) and its associated value according to equation [1] are determined for each node of the octree. The corresponding element is determined as an outer, inner or edge region based on the value determined with equation [1]. In addition, the value of the function f(p) is divided by the number of adjacent or adjoining elements or surfaces. The resulting information about the respective node of the octree or the edge intersection point p, e.g. their coordinates, can be stored, for example, in form of a table.

The elements identified as being located in an outer region (also called black elements) are recursively subdivided into partial polyhedra, e.g. sub-octahedra, for minimizing their size, and a predetermined error tolerance is determined. Those outer regions which have a predetermined minimal size are referred to as voxels and identified as edge regions or edge voxels. The edge voxels approximately represents the surface of the corresponding body or workpiece.

Figure 4:
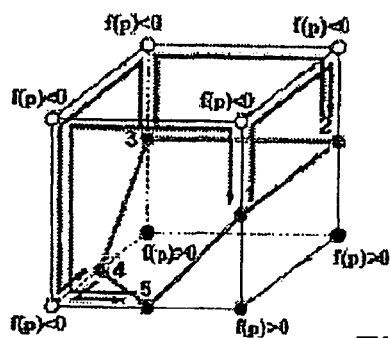
FIGS. 4 to 6 an envelope formed with voxels.
Figure 5:
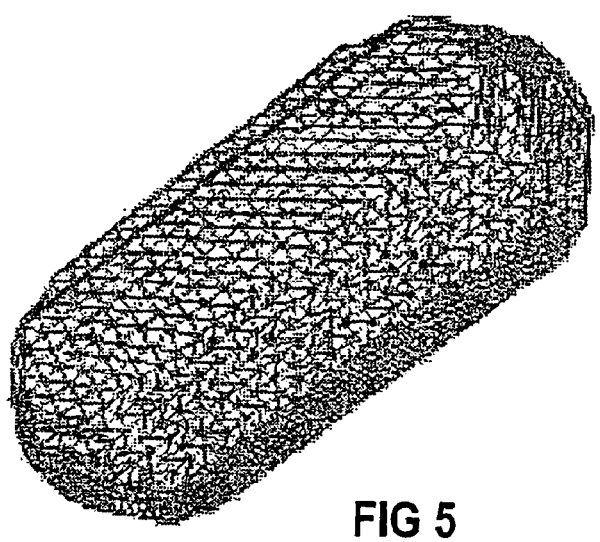
Figure 6:
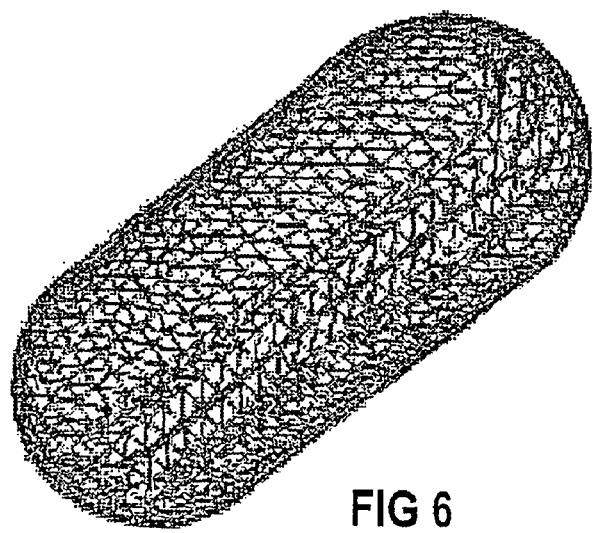

Alternatively or in addition, the given polyhedra, e.g. the octahedra, are subdivided into partial polyhedra in order to approximate the contour by changing target distance fields based on the original element or the reference polyhedron. As shown in FIGS. 4 to 6, the surface or contour of the dynamic workpiece is determined stepwise based on algorithmic polyhedrization by determining the apex points or edge intersection points (also nodes). For this purpose, the next following node of the surface is determined based on a predetermined voxel clockwise around the contour of the workpiece, starting from an starting or origin node. The clockwise determination of the nodes is represented by consecutive numbering from 1 to 5. When a new node is determined, the previous contour around the previous node is replaced by a new actual contour that includes the new node. FIGS. 5, 6 show the envelope of the workpiece determined by polyhedrization. The envelope depicted in FIG. 5 is formed by connecting the centers, whereas the envelope in FIG. 6 is formed by linear interpolation.

Depending on how the method is executed, the surface of the body is reconstructed using an octree structure by a polygonal or multi-corner approximation of the body surface based on the determination of different configurations of the corner points or nodes of the outer voxels, in particular the edge voxels. The distance values (also referred to as node length) f(p) for the nodes are determined and stored in table form. The eight node or voxel points representing at octree have corresponding negative or non-negative values and render 256 different corner or node configurations. Depending on the actual values, these can be determined using a so-called table method referred to as "Marching Troops" (Lorensen, W. E., Cline, H. E., "Marching Cubes: A High Resolution 3-D Surface Construction Algorithm", Computer Graphics 21 (3), 1987, page 163–169) or another algorithmic method. The continuous functions are implicitly defined and extend through a node of a voxel, with the node connecting differently identified coordinates. The surface structure of the workpiece can be coarsely approximated by forming the centers of the nodes or corners of the voxel. The accuracy of the approximation of the surface structure during reconstruction can be improved by determining either an accurate intersection, in particular by halving or by the so-called Newton interpolation, or by another linear interpolation based on the values for the nodes or the voxel corners. The envelope depicted in FIGS. 5 to 6 shows two triangular grids with or without linear interpolation for different approximation methods.

The dynamic octree manipulation which can continuously update the surface structure will now be described. A surface of the workpiece that changes, for example, due to the actions of a milling cutter, can be accurately reconstructed by a polygonal approximation of a target or finished surface of the workpiece according to equations [4] and [5]. The volume $L_i$ is determined by a linear interpolation of $S(t_1+idt)$ and $S(t_1+(i+1)dt)$ (with S=body, i=natural number, t=time). Instead of the complex determination of the implicit form according to equations [4] and [5], the change in the surface structure resulting from the milling cut and therefore the volume $L_{i+1}$ of the combined set of all volumes representing the cut is determined according to $L_0 \cup \ldots \cup L_i$. This dynamic reconstruction of the surface determines an envelope or edge body (also referred to as bounding box or original body of the octree). The size of this edge body is selected to be sufficiently large so that the entire dynamic volume given by equation [4] is taken into account when determining the original volume $V_0$ of the octree. In addition, the dynamic octree, which is determined approximately for the portion of the envelope by combining the volumes of $L_0 \cup L_1$, is determined by relating the original volume $L_0$ to the changes of the volume $L_1$. The elements of the voxels identified as interior (inner) regions or interior elements are hereby eliminated, since those regions or elements do not change during machining. In other words: the surface machining which represents the milling process and changes the contour of the workpiece, is reconstructed by approximately determining a voxel having a dynamic volume and forming an envelope. This approximation which takes into account only the outside or surface of the voxel, i.e. the envelope, provides a particularly rapid and simple method for reconstruction. In other words: the afore-described method only determines and identifies the surface as a edge or outer surface which is represented by a type of foil or envelope and subsequently updated according to the desired machining process.

Figure 7:
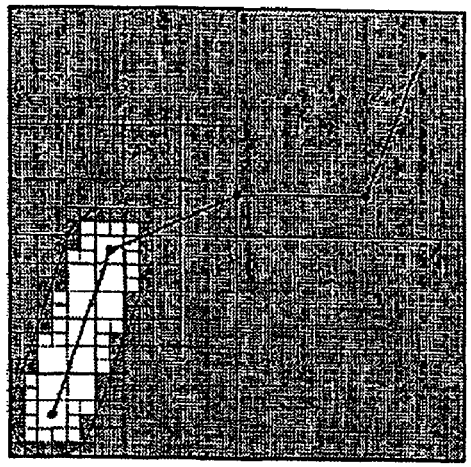
FIGS. 7 to 9 dynamic updating of a quadtree along a polygonal path.
Figure 8:
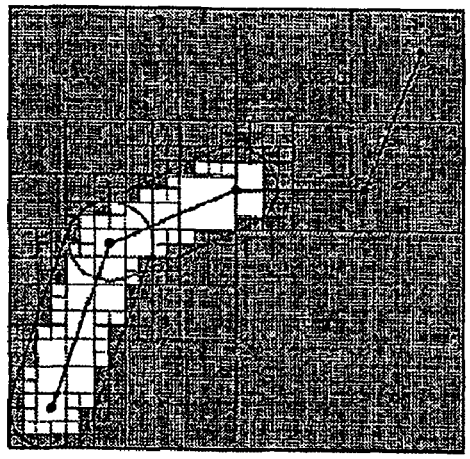
Figure 9:
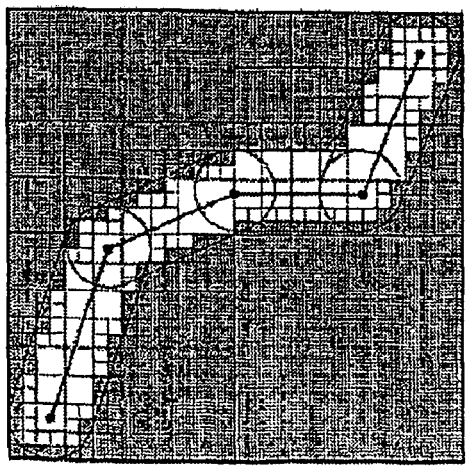

FIGS. 7 to 9 show a dynamic updating of the volume of a quadtree that describes the envelope of a circle moving along a polygon. This situation describes, for example, machining of a workpiece with a spherical milling cutter along a polygon. The corresponding polyhedron, octree or quadtree, is evaluated step-by-step to determine if its edges are located inside your outside the volume $L_0$. If an edge of the corresponding polyhedron is located outside the volume $L_0$, then a sub-octree with the volume $L_1$ is advantageously formed. In this way, the underlying motion or step of the milling cutter is determined. It is also analyzed if an edge is identified as a marginal edge. If this is a case, then this edge is marked either as being located inside the volume $L_1$ or not. If the edge is identified as not being located inside the volume $L_1$, then the step or the motion of the original octree is determined with reference to the volume $L_1$. This ensures that all sub-octrees of the original octree which are located inside the volume $L_1$ are eliminated, which can reduce the number of computing steps and the computing time as well as memory space.

A particularly accurate result can be achieved by continuously determining and updating the values of the functions f(p) representing the nodes or voxel corners. In particular, only new values are analyzed and calculated, since a region which is identified as an interior region or an interior voxel remains located in the interior and therefore needs not to be considered. The new values are determined according on their order, i.e. corresponding to the time and/or the coordinate sequence, as old and/or new values and placed in the table.

Depending on the preset conditions, the method described above is repeated until the volume $L_{t2-dt}$ has been determined. In this way, an octree which represents the entire motion of the body, i.e., an envelope that describes the motion, in particular the machining of a workpiece by a geometrically defined milling cutter, is determined based on the equations [4] and [5]. The octree has an error tolerance given by the equations [4] and [5]. The error tolerance is determined by the size of the voxel or the maximum depth of the octree and hence by the edge length. Advantageously, a sufficiently small time difference dt (=time between the determination of two volumes) is defined, which results in an error tolerance with the discrete approximation according to equation [4] which is smaller than the size of the voxel. The resulting dynamically changing octrees or quadtrees are depicted in FIGS. 7 to 9. Voxels which are subdivided according to a predefined maximum resolution, can be combined with each other or removed during the process depending on their location (=outside, inside or on the edge).

Figure 10:
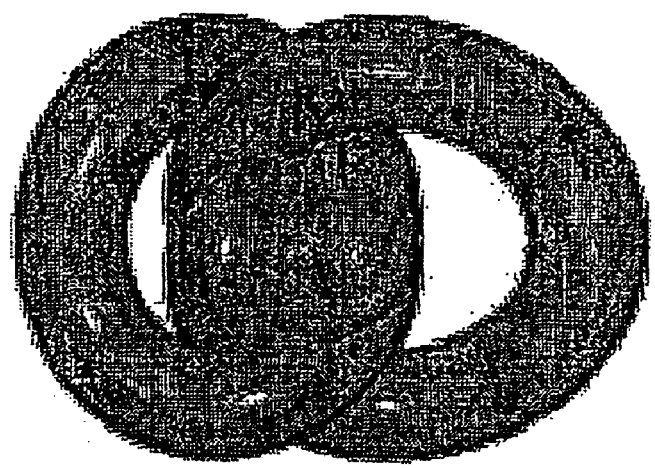
FIGS. 10 to 11 examples of different envelopes with a so-called aliasing effect, FIGS. 12 to 13 a triangular grid with rotation of an edge, FIGS. 14 to 15 examples for different envelopes before and after edge rotation, and FIG. 16 an example of an envelope for an industrial application.
Figure 11:
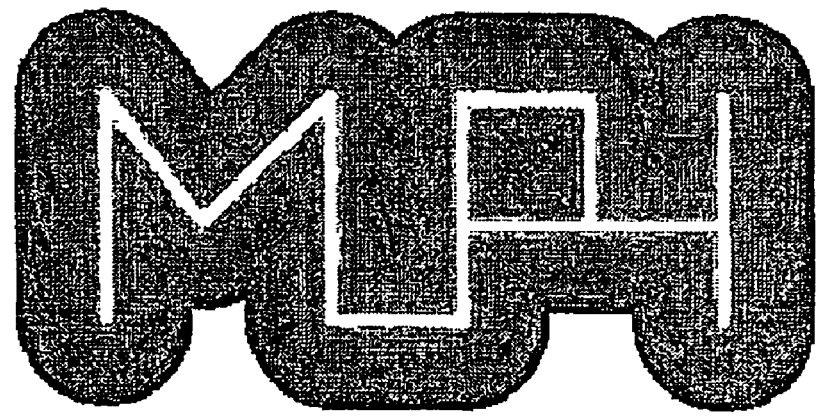

FIGS. 10 and 11 illustrate several examples for reconstructed intersections of a milling cutter. According to FIG. 10, a sphere or spherical milling cutter with a radius of r=2 mm moves along a node curve k(t) defined by:

$$k(t) = \begin{Bmatrix} 10\cos(t) + \cos(3t) + \cos(2t) + \cos(4t) \\ 6\sin(t) + 10\sin(3t) \\ 4\sin(3t)\sin\left(\frac{5}{2}t\right) + 4\sin(4t) - 2\sin(6t) \end{Bmatrix} \quad [7]$$

with $$dt = \frac{2\pi}{1000}$$

and an edge length for the smallest voxel of 0.02 mm (=predetermined error tolerance). A resulting polygonal approximation based on a decomposition of a given convex polyhedron, e.g. a cuboid or octahedron, into triangles includes approximately 376,000 triangles. An evaluation with the equations [4] and [5] takes approximately 50 seconds.

FIG. 11 shows another example, where the spherical milling cutter has a radius of r=5 mm and moves along a polygonal path of 13 points. The letters "MPI" are milled into the surface of the workpiece as an intersection. The smallest voxel has an edge length of approximately 0.02 mm. A resulting envelope which describes the surface of the workpiece based on a triangular grid includes approximately 500,000 triangles. An evaluation with the equations [4] and [5] takes approximately 20 seconds. Reconstruction of the second surface with FIG. 11 is faster than the reconstruction depicted in FIG. 10 because a smaller predefined time unit was used.

The error tolerance of the aforedescribed method is determined by the predetermined maximum length of the voxel, also referred to as edge length. The discrete approximation according to equation [4] and the applied triangulation for the determined nodes can cause aliasing effects which can be seen in FIG. 11. Such aliasing effects caused by the discrete approximation can be advantageously be reduced by rotating individual edges of triangles of the grid which describes the envelope of the workpiece during the aforedescribed triangulation (=decomposition of the convex polyhedrons into triangles). For this purpose, a curvature function is preferably determined and defined as a parameter for the grid quality. Such curvature function can be defined, for example, by a normal distribution of triangles that adjoin the edge to be rotated or by the so-called discrete Gaussian curvature. Different methods can be used for determining the discrete Gaussian curvature of the polygonal grid depending on the specified parameters. A fast and numerically stable method for determining the Gaussian curvature and the curvature tensors is described, for example, in Taubin, G., "Estimating the tensor of curvature of the surface from a polyhedral approximation," Proc. ICCV '95, 1995, pp. 902 to 907, and is used with the aforedescribed method.

Figure 12:
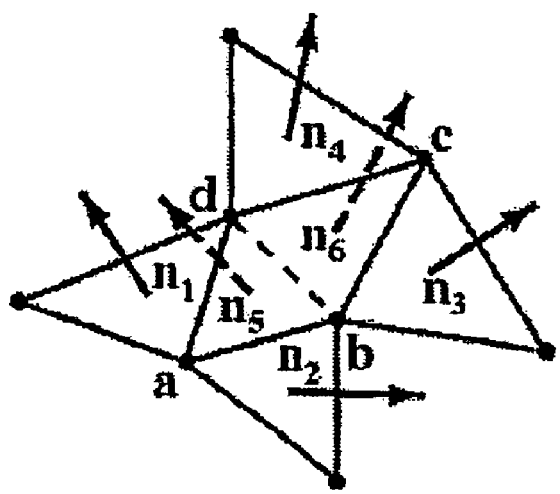
Figure 13:
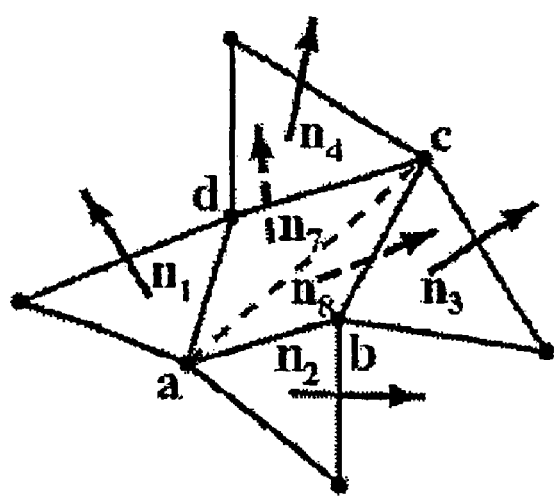

Preferably, the method of normal distribution of adjoining triangles is used with the aforedescribed method for reconstructing the surface. This method is described with reference to exemplary embodiments depicted in FIGS. 12 and 13. FIGS. 12, 13 depict a portion of an envelope representing a workpiece contour, which is determined and illustrated based on a grid formed from the triangles $n_1$ to $n_6$ (see FIG. 12) or from the triangles $n_1$ to $n_4$, $n_7$, $n_8$ (see FIG. 13). In the triangulation of the envelope according to FIG. 12, the edge bd formed by the nodes bd, which border the triangles $n_5$, $n_6$, is rotated such that an edge ac is formed (shown as a dashed line in FIG. 13) that connects the nodes ac. The triangles $n_7$, $n_8$ which border the new edge ac are formed according to the normal distribution with minA\ min(a))>min(B\ min(B)), wherein A={$n_1^T n_5$, $n_4^T n_5$, $n_3^T n_6$, $n_2^T n_6$} and B={$n_1^T n_7$, $n_4^T n_7$, $n_3^T n_8$, $n_2^T n_8$}.

Figure 14:
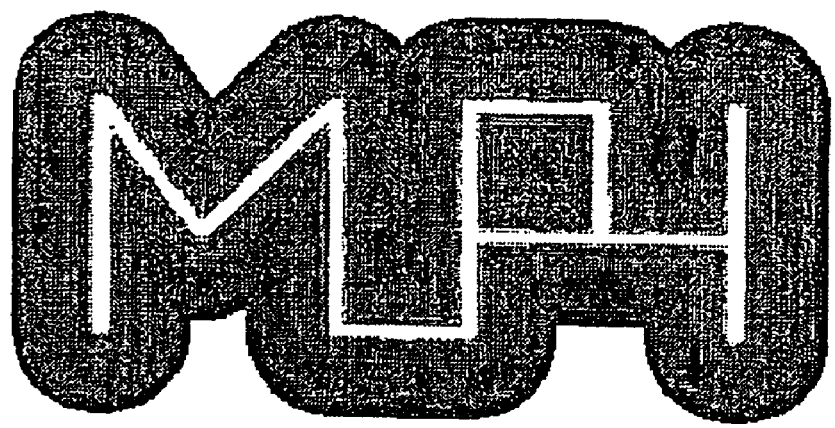
Figure 15:
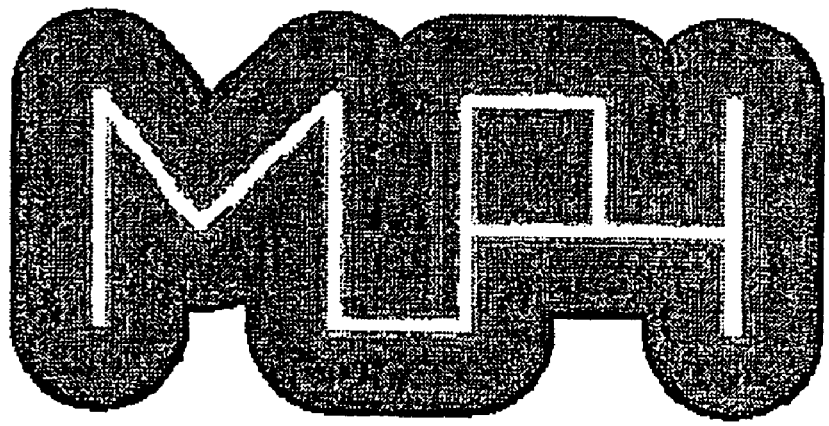

FIGS. 14 and 15 show a surface reconstructed within envelope before and after the aforedescribed method step of edge rotation. As can be seen, edge rotation significantly improves the quality of the surface reconstruction, as illustrated in FIG. 15. So-called aliasing effects are mostly eliminated. As a result of the improved approximation method, the local minima of the function are the determining factor for the grid quality. The edge rotation process can be executed twice or several times depending on the predefined achievable grid quality.

Figure 16:
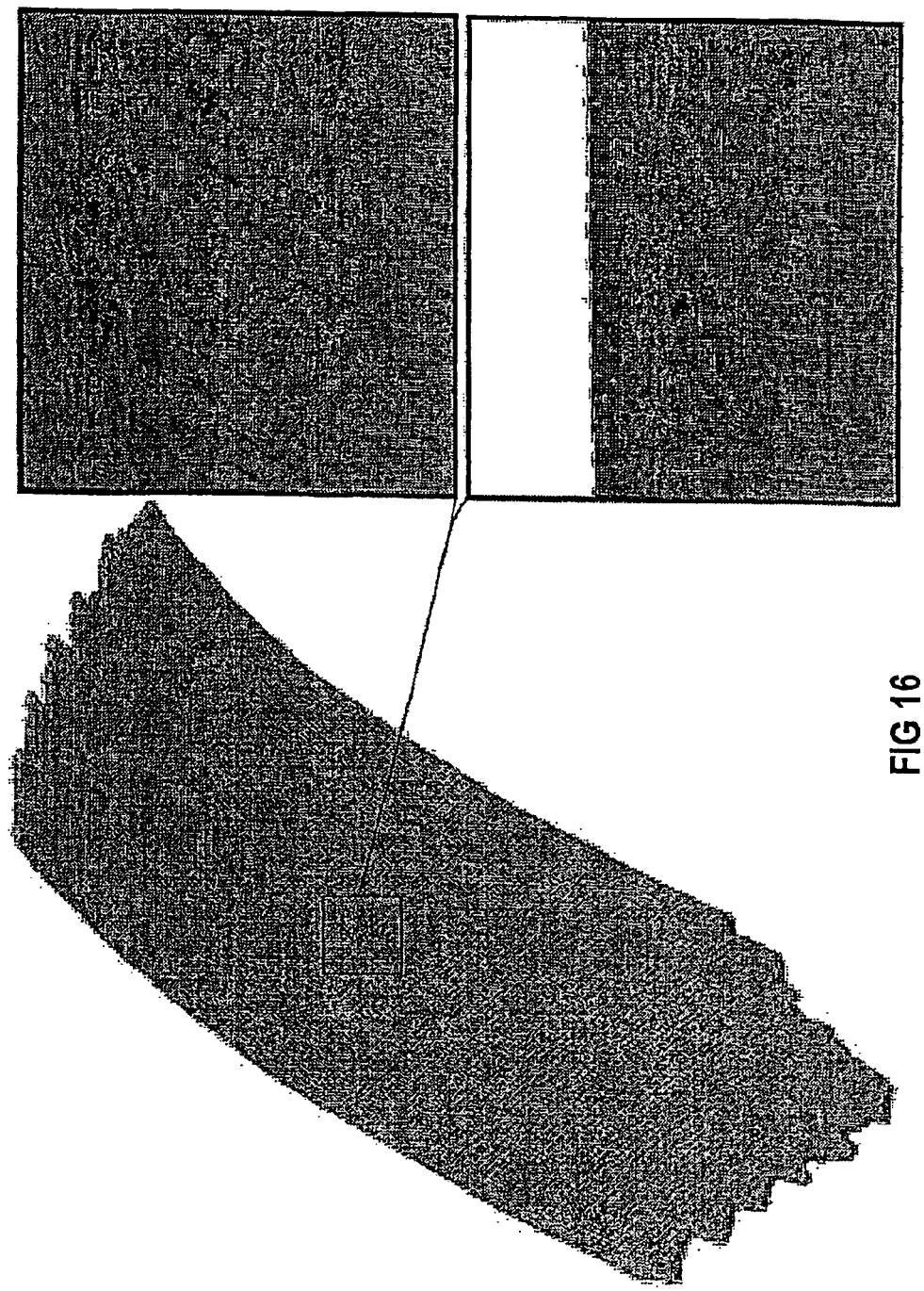

FIG. 16 depicts an exemplary industrial application of the aforedescribed method for reconstructing the surface of a workpiece. The illustrated surface shows an envelope obtained with the aforedescribed reconstruction method, which describes a motion of a spherical grinder or milling cutter with the diameter of r=1 mm along a polygonal path defined by 2168 points. The edge length of the voxels which approximately describe the surface and therefore also the envelope, is approximately 0.01 mm. The envelope derived from the voxels includes approximately 1.4 million triangles. Computation of the surface with the aforedescribed approximation method based on equations [4] and [5] takes approximately 15 minutes.

In summary, the surface of a dynamically changing body can be reconstructed by a polygonal approximation which is based on a continuous updating of a dynamically changing octree. The surface is hereby approximated based on an envelope formed with the octree. The envelope of the workpiece contour is reconstructed based on analytical steps, i.e., a linear approximation of intersections, of the defined milling geometry using voxels which represents a workpiece in form of a convex polygon that is subdivided into triangles. This allows an adjustable error tolerance with predefined parameters which characterizes the envelope. Accordingly, depending on a user definition, the workpiece can be represented quite accurately by adjusting the error tolerance. In addition, a finer or rougher resolution can be set and the aforedescribed method can be executed in real-time. The described method is also particularly robust and due to its simplicity and speed, can advantageously be used for NC-milling simulations with a large number of steps.

What is claimed is:

1. A method for approximately reproducing the surface of a workpiece machined with a milling cutter, comprising the steps of:
   a) subdividing in a first approximation step a starting body representing at least a part of the workpiece into a plurality of volume elements,
   b) identifying a subset of volume elements from the plurality of volume elements having an intersection with an analytical representation of a milling volume traversed by the milling cutter along a traversed milling path, thus defining an outer surface of the milling volume,
   c) subdividing in a subsequent approximation step each volume element of the identified subset of volume elements that includes the outer surface of the milling volume into a new plurality of volume elements,
   d) repeating with the new plurality of volume elements steps b) and c) until a predetermined resolution is achieved,
   e) determining, for the plurality of volume elements with the predetermined resolution, at least approximately edge intersection points with the outer surface of the milling volume, and
   f) connecting the edge intersection points between pairs of adjacent edges of the volume elements to form a triangular grid representing the approximately reproduced surface.

2. The method of claim 1, and further comprising the step of determining for each partial volume up to 12 edge intersection points with the analytical reproduction to calculate the intersection of the partial volume with the analytical reproduction.

3. The method of claim 1, wherein an edge intersection point is determined as a point halfway between two corner points of a volume element.

4. The method of claim 1, wherein an edge intersection point is determined by a linear interpolation between two corner points of a volume element.

5. A computer program, residing on a computer readable medium, comprising instructions for causing a computer to approximately reproduce the surface of a workpiece machined with a milling cutter, by
   a) subdividing in a first approximation step a starting body representing at least a part of the workpiece into a plurality of volume elements,
   b) identifying a subset of volume elements from the plurality of volume elements having an intersection with an analytical representation of a milling volume traversed by the milling cutter along a traversed milling path, thus defining an outer surface of the milling volume,
   c) subdividing in a subsequent approximation step each volume element of the identified subset of volume elements that includes the outer surface of the milling volume into a new plurality of volume elements,
   d) repeating with the new plurality of volume elements steps b) and c) until a predetermined resolution is achieved,
   e) determining, for the plurality of volume elements with the predetermined resolution, at least approximately edge intersection points with the outer surface of the milling volume, and
   f) connecting the edge intersection points between pairs of adjacent edges of the volume elements to form a triangular grid representing the approximately reproduced surface.

6. The computer program of claim 5, and further causing the computer to determine for each partial volume up to 12 edge intersection points with the analytical reproduction to calculate the intersection of the partial volume with the analytical reproduction.

7. A computer programmed with a computer program product comprising instructions for causing the computer to approximately reproduce the surface of a workpiece machined with a milling cutter, by a) subdividing in a first approximation step a starting body representing at least a part of the workpiece into a plurality of volume elements, b) identifying a subset of volume elements from the plurality of volume elements having an intersection with an analytical representation of a milling volume traversed by the milling cutter along a traversed milling path, thus defining an outer surface of the milling volume, c) subdividing in a subsequent approximation step each volume element of the identified subset of volume elements that includes the outer surface of the milling volume into a new plurality of volume elements, d) repeating with the new plurality of volume elements steps b) and c) until a predetermined resolution is achieved, e) determining, for the plurality of volume elements with the predetermined resolution, at least approximately edge intersection points with the outer surface of the milling volume, and f) connecting the edge intersection points between pairs of adjacent edges of the volume elements to form a triangular grid representing the approximately reproduced surface.

* * * * *